United States Patent [19]

Booth

[11] Patent Number: 4,509,091
[45] Date of Patent: Apr. 2, 1985

[54] METHODS AND APPARATUS FOR CONTROLLING THE ENGAGEMENT OF GAP-TYPE ELECTROMAGNETIC COUPLINGS

[75] Inventor: Dwight E. Booth, Janesville, Wis.

[73] Assignee: Warner Electric Brake & Clutch Company, South Beloit, Ill.

[21] Appl. No.: 581,108

[22] Filed: Feb. 17, 1984

[51] Int. Cl.³ ............................................. H01F 7/18
[52] U.S. Cl. .................... 361/154; 192/3.56; 192/84 R; 192/84 C
[58] Field of Search ............... 361/154, 152, 160; 192/3.56, 21.5, 53 D, 84 R, 84 C

[56] References Cited

U.S. PATENT DOCUMENTS 2,808,917 10/1957 Harter .............................. 192/84 C
3,581,156 5/1971 Dolbachian ........................ 361/154
4,160,498 7/1979 Newton et al. .................... 192/84 C
4,376,476 3/1983 Hagiri .............................. 361/154 X Primary Examiner—Harry E. Moose, Jr.
Attorney, Agent, or Firm—Leydig, Voit, Osann, Mayer & Holt, Ltd.

[57] ABSTRACT

A control unit and method for operating a gap-type electromagnetic clutch or brake is provided which reduces audible chatter, screeching caused by belt slippage and related wear and tear on the driving and driven components. The operating winding of the clutch or brake is energized to cause the gap between an armature and rotor to close, energization of the winding is then reduced to initially reduce the torque coupling between the armature and rotor and finally energization of the winding is gradually increased to full energization so as to provide a gradually increasing torque coupling between the armature and rotor.

23 Claims, 7 Drawing Figures

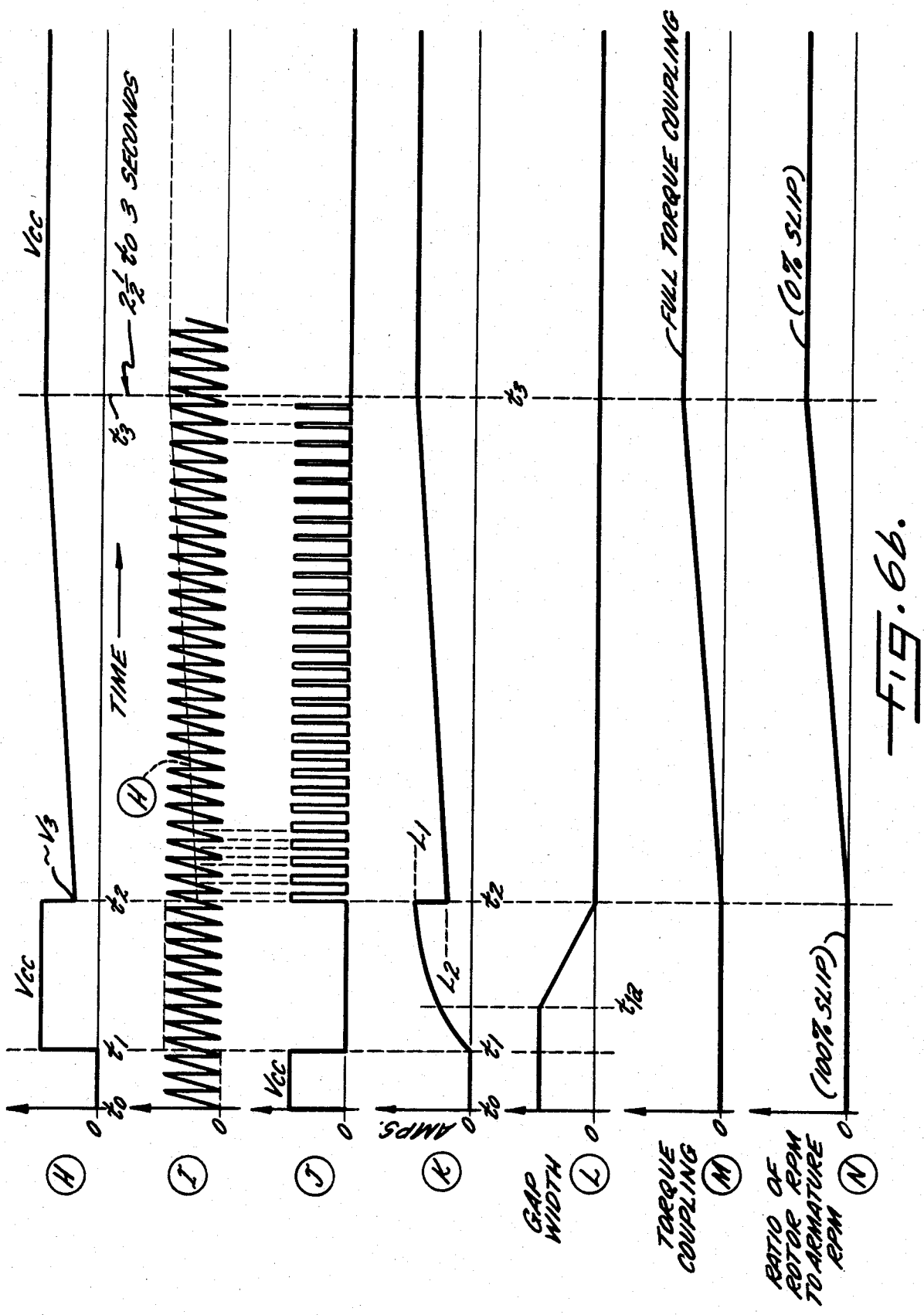

METHODS AND APPARATUS FOR CONTROLLING THE ENGAGEMENT OF GAP-TYPE ELECTROMAGNETIC COUPLINGS

FIELD OF THE INVENTION

This invention generally relates to a control unit for electromagnetic couplings and, more particularly, to methods and apparatus for controlling an electromagnetic clutch or brake—having two members normally separated by a gap such that engagement occurs without sudden mechanical shocks, and stick-slip chatter.

BACKGROUND OF THE INVENTION

In some commonly known electromagnetic clutches having a stationary magnetic core, a rotor and a relatively rotatable armature, an air gap separates the rotor from the armature when the electromagnet is de-energized. The armature is held away from the rotor by means of leaf springs secured to a pulley assembly which in turn is keyed to the shaft about which the clutch rotates. A multiple-turn winding (i.e., clutch coil) is carried by the magnetic core and, when energized, produces magnetic flux which threads a path through the magnetic core, the rotor and the air gap to the armature whereby the armature is drawn toward the rotor. By way of this flux coupling, the armature is moved to close the gap and engage the rotor so the two are coupled by friction and one drives the other without slippage. The coupling torque between the rotor and the armature is dependent in part upon the m.m.f. produced by the coil and the magnetic force created by flux threading the interface between the rotor and the armature.

Typically, when full or rated voltage is applied to an initially de-energized clutch coil (i.e., a step voltage), the current rises exponentially due to the inductance of the coil. In a gap-type electromagnetic clutch, at a predetermined level of current the m.m.f. in the magnetic path becomes sufficient to pull the armature into contact with the rotor against the bias of the springs. At the instant of gap closure (touching of armature to rotor) the coil current and the m.m.f. may have almost reached the rated or maximum values, but the flux is still rising because the reluctance of the entire flux path falls dramatically as the gap narrows and closes. Because torque transmission between a touching rotor and armature is generally proportional to the flux crossing the interface, if rated voltage is applied at a first instant to the coil, the armature more or less slams into engagement with the rotor at a later second instant with a slight delay determined by coil inductance and mechanical inertia. But at the second instant, torque transmission between the rotor and armature virtually jumps from zero to the rated value.

Such jump in torque may cause (i) an undesirably sudden loss in speed of the prime mover supplying input power to the clutch, (ii) undue shock or strain on driving or driven components, including belts or chains, and (iii) unpleasant engagement noise and belt screech. In addition, when the rotor and armature are engaged, the inertia of the slower moving of the two (and its load) needs to be overcome before the full torque coupling locks the rotor and armature into synchronized rotation. After touching (i.e., initially after gap closure) and while the load inertia is being overcome, frictional slippage occurs at the rotor-armature interface; but due to existence of the maximum or rated magnetic attraction force, this slippage is not smooth; instead, it involves stick-slip action (alternate slips and holds) which produces chatter noise and undue wear at the interface. This alternating slip-hold vibratory engagement or chatter is sometimes evidenced by a loud audible vibration or "screeching" noise generated at the rotor-armature interface.

Some clutches and brakes have been associated with control units which produce a so-called "soft start" action. In these, the average coil current and the average m.m.f. are smoothly increased from zero to maximum or rated values. This works satisfactorily for clutches and brakes in which the armature and rotor are not separated by a gap, but instead relatively rub with light contact when the clutch is "disengaged". In this sort of arrangement, slippage gradually decreases, torque gradually increases and "chatter" does not occur. Mechanical shocks on a prime mover and associated driven components are alleviated when a gapless type clutch or brake is excited with a smooth ramp to produce a "soft start".

Applicant has discovered that when a gap-type clutch is brought into engagement with a so-called "soft-start" control unit, the armature is not shifted—against the force of the biasing springs to cross the gap and touch the rotor—until the gradually rising average current and average m.m.f. have reached, or almost reached, their rated or maximum values. Thus, by the instant that the cooperative friction faces come into contact, the magnetic force of attraction is essentially at its maximum, and a sudden, large step change in torque is experienced with all the noise, shock and wear problems described above. Ramping the average voltage and current works well for zero-gap magnetic clutches, but it will not solve the problems for a gap-type clutch or brake.

SUMMARY OF THE INVENTION

It is the primary aim of the present invention to provide control apparatus and methods for a gap-type electromagnetic (clutch or brake) coupling which reduce the noise, shocks and undue wear associated with engagement of the coupling. More specifically, it is an object to provide a control unit for exciting a gap-type electromagnetic clutch or brake which reduces (i) the audible chatter at the cooperating friction faces of the engaged members, (ii) screeching caused by the slippage of an endless belt on the output side of the clutch due to sudden rise in torque, and (iii) related wear and tear on the driving and driven components.

It is another object of the present invention to provide a control unit for energizing a gap-type electromagnetic clutch in a fashion which alleviates noticeable sudden changes in the speed of an associated prime mover.

Other objects and advantages of the invention will become apparent from the following detailed description and the accompanying drawings.

In accordance with the invention an apparatus and method is provided for energizing the multiple-turn winding and associated magnetically permeable flux path of an electromagnetic coupling having two members (e.g., an armature and a rotor) normally separated by an air gap; the energization of the winding is controlled initially (after some stimulating signal calling for engagement) to produce a high average m.m.f. sufficient to pull the two members against the bias of springs and into engagement; but the average coil current and average m.m.f. are thereupon reduced after closure of the air gap separating the two members so as to decrease the torque below that level which would otherwise be transmitted between the two members immediately at the instant of gap closure. Immediately following the reduction in average m.m.f., the energization of the winding is gradually increased until full torque coupling is achieved and the rotor and the armature turn synchronously without slippage. Preferably, the energization of the winding is reduced to a level which produces zero torque coupling and 100% slippage after the armature has been drawn into contact with the rotor. But the coil energization is not reduced to zero, since the reduced level is chosen to prevent the gap from reopening. To control the energization of the winding, an electronic circuit is constructed to include (1) first means responsive to a stimulating signal for initially energizing the winding to create an average m.m.f. which draws the two members into contact, (2) second means responsive to the first means for reducing the average m.m.f. in the flux path of the coupling so as to reduce the torque coupling between the two members, and (3) third means then operative to gradually increase the average m.m.f. in the flux path from the reduced value to a predetermined higher value so as to produce rated torque transmission without relative slippage of the members. By energizing the winding in this manner, a surprising reduction of engagement noise results. In addition, the engagement of the clutch is considerably smoother than that produced by prior art controls and methods since the initial torque coupling between the armature and rotor can, in preferred embodiments, be made near zero; this means that when the gap closes, slippage is essentially 100% and it thereafter decreases progressively to 0%.

BRIEF DESCRIPTION OF THE DRAWINGS

FIGS. 6a and 6b together show a series of curves illustrating variations in certain voltages, currents, and other variables with time during operation of the circuit in FIG. 5.

While the invention will be described in some detail with reference to a preferred embodiment, it is to be understood that it is not intended to limit the invention to such detail. On the contrary, it is intended here to cover all alternatives, modifications and equivalents which fall within the spirit and scope of the invention as defined by the appended claims.

DETAILED DESCRIPTION OF THE PREFERRED EMBODIMENT

Figure 1:
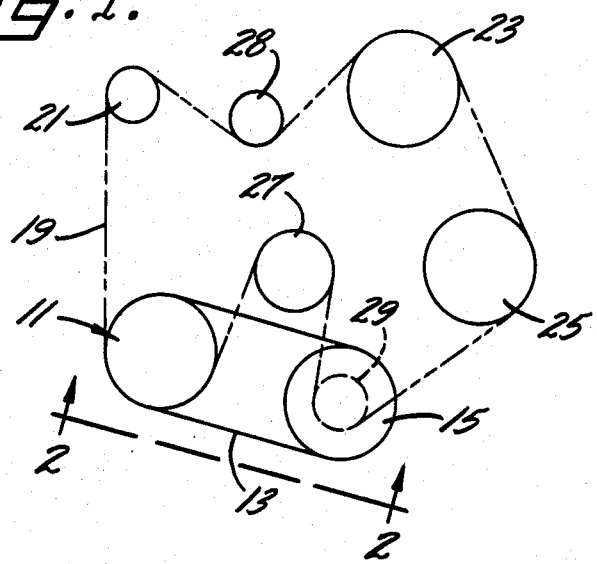
FIG. 1 is a schematic diagram of an accessory drive system for an engine-driven vehicle showing a clutch configuration which allows the accessories to be driven with either of two ratios in relation to engine speed.
Figure 2:
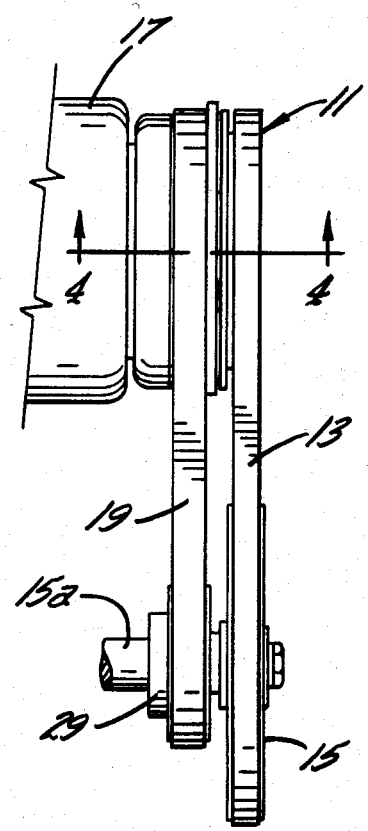
FIG. 2 is an enlarged side view, taken along the line 2—2 in FIG. 1, and showing the system's clutch and crankshaft pulleys.

Referring first to FIGS. 1 and 2, accessory drives in automobiles have traditionally utilized a direct-drive configuration with the accessories having a linear speed relation to engine crankshaft speed. In the direct-drive configuration, at high engine speeds the accessories are driven at rotational velocities considerably in excess of those actually required. With increasing concern in recent years about fuel-efficient operation of automobiles, two-speed accessory drives have been developed which in part eliminate excessive rotational speed of accessories. By reducing the speed of the accessories relative to engine speed in the high crankshaft speed range, increased miles-per-gallon performance by the autmobile may be realized.

To implement a two-speed accessory drive, the armature side of a gap-type electromagnetic clutch 11 is drivingly connected by an endless belt 13 to a pulley 15 on the engine crankshaft 15a. The clutch 11 is disposed concentrically about the rotatable shaft 16 of an air pump 17. The circular armature 18 of the clutch is carried, with freedom for limited axial movement by virtue of leaf springs 50, on an armature pulley 51 which is held fast on the shaft 16 by key 53. The air pump 17 is an emissions control device which must be run at speeds linearly proportional to the engine speed. Therefore, the circular armature 18 is conveniently carried by the pulley 51 which provides a direct drive for the air pump 17 from the crankshaft pulley 15 by way of the endless belt 13.

In order to drive the autmobile's accessories, a second endless belt 19 is trained around pulleys for an alternator 21, an air conditioner 23, a power steering pump 25 and a water pump and fan assembly 27. An idler pulley 28 aids in tensioning the endless belt 19. The endless belt 19 is also trained around a one-way or "overrun" type clutch 29 mounted on the crankshaft 15a and the grooved pulley surface of an annular rotor 30 for the clutch 11. Since both the one-way clutch 29 and crankshaft pulley 15 are mounted on the crankshaft 15a, the one-way clutch 29 is coaxial with the crankshaft pulley 15 but its belt surface diameter is approximately one-half of that for the pulley 15.

Figure 3:
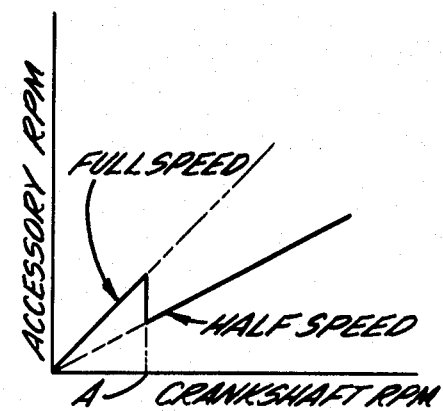
FIG. 3 is a graphic representation of the two speeds of the accessory drive system in relation to the speed of the engine crankshaft.

In operation, when the engine is running at below a preselected value A in FIG. 3, the clutch 11 is engaged so that the rotor 30 and the armature 18 are driven in unison by input from the belt 13. Since the diameter of the rotor 30 of the clutch is greater than the outer diameter of the one-way clutch 29, it follows that when the clutch is engaged, the belt 19 drives the outer component of the one-way clutch faster than crankshaft speed. The one-way clutch is constructed, in known fashion, such that its outer component freely overruns its inner component and the crankshaft 15a in these circumstances. By contrast, at crankshaft speeds greater than a value A, the clutch 11 is de-energized and the rotor 30 is disengaged (as shown) from the armature 18. Now, the speed of the rotor and the outer component of clutch 29 tend to be zero or less than crankshaft speed, but because the one-way clutch 29 "engages", it causes the belt 19 to drive the rotor 30 from the crankshaft 15a. Since the one-way clutch 29 has a smaller diameter than the crankshaft pulley 15, the ratio between the accessory and engine speeds is reduced when the clutch 11 is disengaged.

Figure 4:
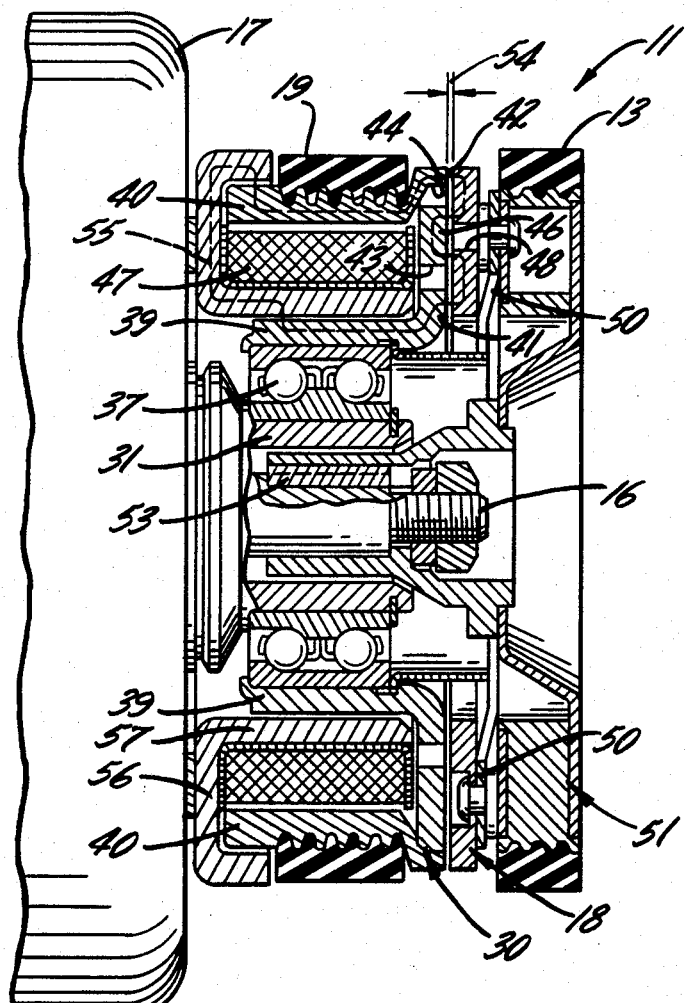
FIG. 4 is a cross-sectional view taken along the line 4—4 in FIG. 2 of the two-speed accessory drive clutch.

Referring now to FIG. 4, the gap-type electromagnetic coupling here shown as a clutch 11 is carried by a tubular nose 31 extending from the housing of the air pump 17 and concentric with the pump shaft 16. The clutch engaging surfaces are provided by first and second members which constitute the clutch armature 18 and rotor 30. The annular rotor 30 is rotatably journaled on the nose 31 by a ball bearing 37. The rotor 30 is substantially U-shaped in radial cross-section and includes inner and outer concentric pole rings 39 and 40 made of magnetic material, the inner ring being secured to the outer race of the bearing 37. Circular pole faces 41 and 42 are defined by the forward ends of the rings 39 and 40, respectively. The pole faces 41 and 42 are magnetically isolated from one another by radially spaced, arcuate slots 43 and 44. The two sets of slots are physically connected by an intervening ring 46. The slots create a zig-zag flux path crossing back and forth across between the rotor and the armature according to a technique known in the art and disclosed in U.S. Pat. No. 4,160,498.

A multiple-turn winding 47 (hereinafter referred to as the clutch coil) is stationary between the inner and outer pole ring 39 and 40 of the rotor 30, being fixed by epoxy on a J-shaped support 56 of ferromagnetic steel and suitably attached to the housing of the air pump 17. The support 56 defines an inner pole ring 57 closely spaced by a short radial air gap from the inner surface of the rotor 30. Because the magnetic support 56 does not totally surround the rotor 30, the drive belt 19 may be trained directly over the outer grooved surface of the rotor which thus functions as a pulley.

When excited by a voltage source, the clutch coil 47 produces magnetic flux which causes engagement of the clutch 11 by drawing the armature 18 into engagement with the pole faces 41 and 42 of the rotor 30. The armature 18 is in the form of a circular disk having one set of arcuate slots 48 similar to those of the rotor's slots 43 and 44. The plural, circumferentially spaced leaf springs 50 provide a rotational drive connection from the pulley 51 to the armature 18 and also bias the armature 18 away from the rotor 30 when the clutch coil 47 is de-energized. The pulley 51 is, of course, continuously driven via the belt 13 from the crankshaft pulley 15. The springs 50 urge the armature 18 to a position in which the armature is spaced from the pole faces 41 and 42 by a narrow axial air gap 54. Upon excitation of the clutch coil 47, magnetic flux threads along a path 55 indicated in dotted line. The rotor's slots 43 and 44 and the armature's flux slots 48 direct the flux path to "zig-zag" back and forth across the armature-rotor gap 54 causing the armature to be drawn into frictional engagement with the rotor's pole faces 41 and 42. Such engagement couples the armature and the rotor for rotation in unison when the magnetic flux and the attractive force become great enough to eliminate slippage.

The flux produced by the m.m.f of the excited coil 47 passes through the magnetic support 56 which, together with the rotor components 39 and 40, the gap 54 and the armature 18 constitute a magnetically permeable flux path structure through which flux threads (see dashed line 55) in response to the m.m.f. which is created by the coil 47 when the latter carries exciting current. It is to be understood that the construction of the magnetic clutch 11 as shown in FIG. 4 represents a typical example of many well-known and specifically different gap-type electromagnetic couplings with which the present invention may be advantageously used.

In accordance with the present invention, the clutch coil is excited initially (when a stimulating or command signal calling for clutch engagement is received) to produce a relatively high (near maximum) average m.m.f. which is sufficient to move the two cooperating members (armature and rotor) into touching contact by closure of the gap; but after the gap is closed, the excitation of the coil is rather drastically reduced and the average m.m.f. is lowered to a degree that the two contacting members may slip rather freely without transmitting appreciable torque. Then, the coil excitation and the average m.m.f. are smoothly increased up to rated values, so the slip is progressively decreased to zero and transmitted torque is progressively increased. In this fashion, the slip-and-hold chatter at the armature-rotor interface is in large measure alleviated, the objectionable noise from such chatter is reduced or eliminated, the driven load is accelerated more smoothly with less intense shocks on mechanical components, and belt "screech" is avoided in systems which employ drive belts.

Figure 5:
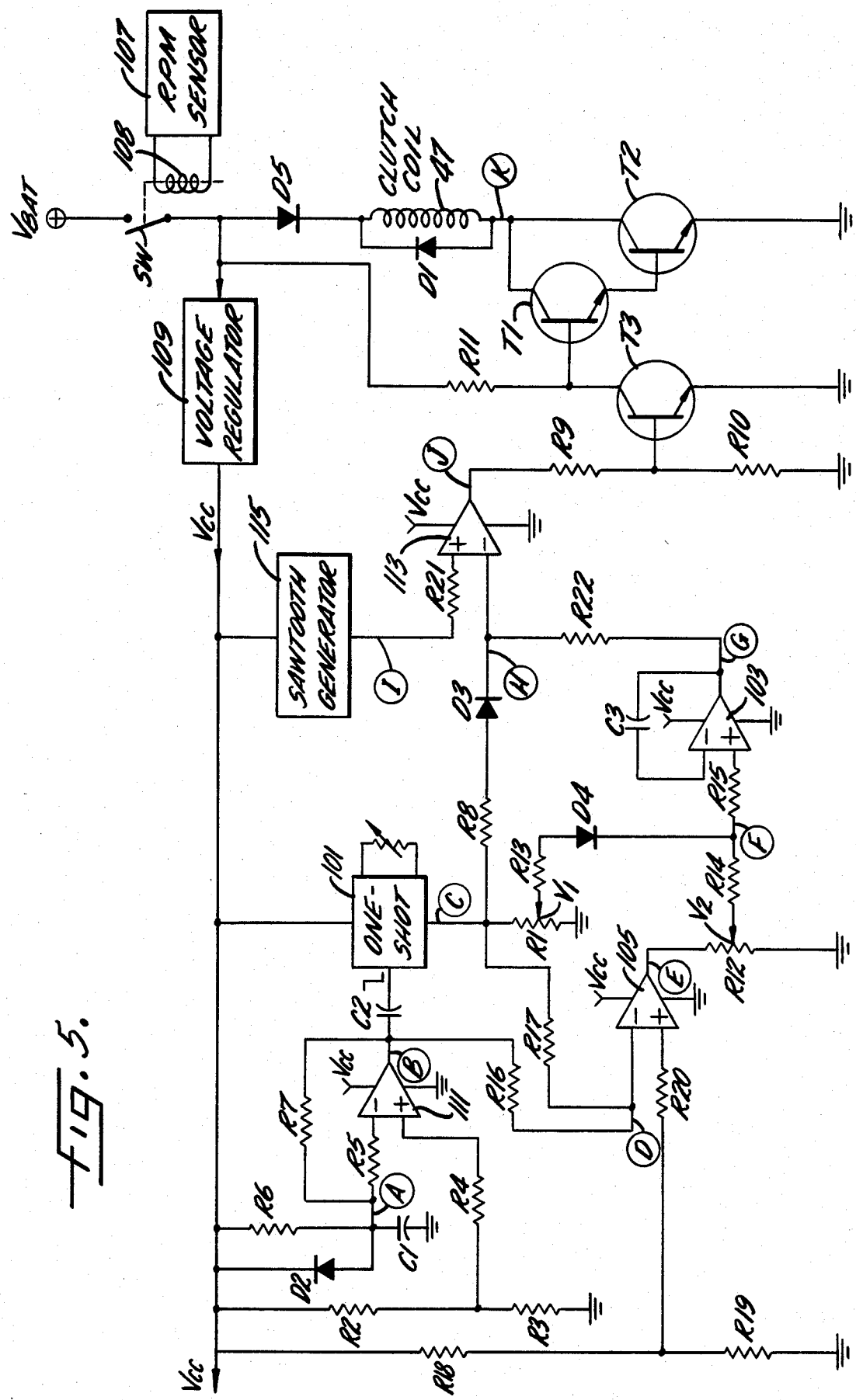
FIG. 5 is a schematic circuit diagram of a clutch control unit constituting an exemplary embodiment of the invention.

A control unit embodying the present invention is illustrated in FIG. 5. It controls the excitation of the clutch coil 47 by current from a suitable dc. voltage source labeled $V_{BAT}$. A stimulating signal which calls for the clutch 11 to be engaged comes from an R.P.M. sensor 107 which excites a relay coil 108 to close contacts SW when the speed of the engine crankshaft 15a (FIG. 2) falls below the preselected speed A (FIG. 3). Specifically, as a result of and after the switch SW closes, a high and near-maximum average current is applied to the clutch coil 47 for a predetermined period of time sufficient to ensure the clutch armature 18 is drawn across the axial air gap 54 and into touching contact with the rotor 30. At the end of this predetermined time period, the "full current" pulse is changed to continue the coil excitation at an average current preferably small enough to produce maximum initial slippage, but this reduce excitation is great enough to hold the armature 18 and rotor 30 in contact. As will become apparent, the control circuit of FIG. 5 controls the duty cycle of voltage pulses applied to the clutch coil 47 and thus controls the average current energization of the coil. Therefore, by gradually increasing the duty cycle of the voltage pulses, the torque coupling between the armature 18 and rotor 30 is gradually increased, preferably over a span of about 2½ to 3 seconds starting from an instant which is timed, by a preselected delay, to substantially coincide with the instant of gap closure. During that time span, the clutch members are brought smoothly from slippage at a high rate to lock-up (zero slippage).

Referring now to FIG. 5, the clutch coil or winding 47 is shown paralleled by a fly-back diode D1 which, as is known, serves to dissipate the "inductive kick" when current flowing through the coil is suddenly interrupted. The coil is connected via a switch SW, when the latter are closed, in series with a suitable dc. voltage source (here labeled $V_{BAT}$) and a final current control element which takes the form of solid state transistors T1 and T2 associated as a Darlington pair. As will become apparent, the paired transistors T1, T2 function as a solid state switch which is, in effect, opened or closed when a control signal at J is respectively high or low in potential relative to the ground reference potential. If the signal at J is high, the voltage at the junction of a voltage divider formed by resistors R9 and R10 is substantially greater than ground potential, and thus the base-emitter junction of a transistor T3 is forwardly based to turn its collector-emitter path fully on. That path draws current through a resistor R11 to produce a voltage drop that places the base of transistor T1 only slightly above ground potential—so the Darlington pair T1, T2 is turned fully off and current cannot flow from $V_{BAT}$ through the coil 47. On the other hand, if the signal at J is low, the transistor T3 is turned off, the voltage drop across resistor R11 is less, and the base-emitter junctions of the pair T1, T2 are biased full-on, so current may flow through the coil and the collector paths of the "fully closed" switch transistors T1, T2.

The switch SW is closed in response to the appearance of a stimulating or command signal which calls for the previously disengaged clutch 11 to be engaged such that mechanical drive will take place from the armature 18 to the rotor 30. In the present example, that command signal comes as a voltage from an RPM (engine speed) sensor 107 to a relay coil 108 associated with the switch contacts SW. When the engine is above the speed A (FIG. 3) the voltage is absent; but when engine speed falls below the preselected value A, the voltage appears as a command and the contacts SW close to connect the voltage source $V_{BAT}$ to the remainder of the control circuit. This in itself does not result in current excitation of the coil 47, however, because the signal at J is initially high (for reasons to be explained) and the final control element transistors T1, T2 are cut off.

Immediately after the switch SW closes, the voltage $V_{BAT}$ is applied as an input to a conventional voltage regulator 109 whose output rises from zero to Vcc volts. The regulated voltage Vcc is constant despite minor fluctuations in the voltage $V_{BAT}$ and serves as the operating voltage source for the remainder of the control unit. The voltage Vcc is fed to a sawtooth generator 115 (per se known in the art) which immediately begins sawtooth oscillations to create an output signal I having a fairly linear sawtooth waveform (see Curve I in FIG. 6b) of a reasonably high frequency (e.g., 400 Hertz) and an amplitude only slightly less than the magnitude of the operating voltage Vcc. The sawtooth signal I is fed via a resistor R21 to the non-inverting input (hereinafter called the + input) of a high gain operational amplifier 113 which functions as a comparator. At this early point in time (just after closure of the switch SW at instant $t_0$ in FIGS. 6a, 6b), the signal H at the inverting input (hereafter, the − input) of op-amp 113 is very low and essentially at zero volts, i.e., ground potential—for reasons to become apparent. Thus, the sawtooth input at I causes the op-amp output at J to be essentially a constant high value equal essentially to Vcc volts. This happens because signal at the + input exceeds that at the − input essentially immediately after each sawtooth ramp rises above zero volts, so that the high gain op-amp 113 goes to saturation.

Figure 6A:
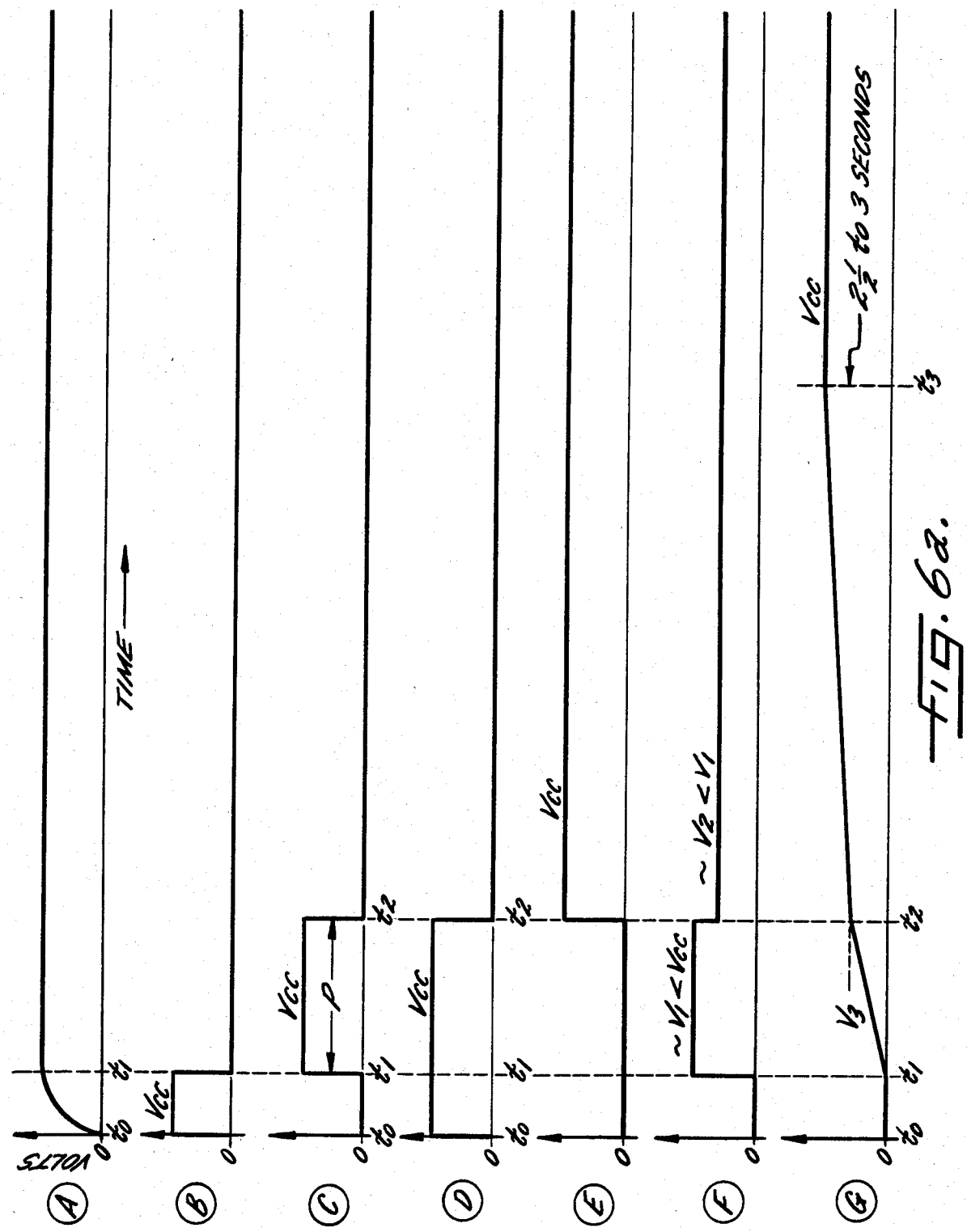

When the operating voltage Vcc appears at the instant $t_0$ essentially coincident with closure of the switch SW, two voltage dividers R2, R3 and R18, R19 are excited and produce at their respective junctions two voltages having respective preselected values lying between zero (ground) and Vcc. The first of those voltages produces input signal current to the + input of an operational amplifier 111 utilized as a comparator and whose output signal B thus rises to the Vcc level (see Curve B in FIG. 6a). The appearance of the operating voltage Vcc also initiates charging of a capacitor C1 through a resistor R6 (shunted by a reversely-poled diode D2 to speed up later discharge of the capacitor) so that the signal voltage A rises exponentially (as shown in FIG. 6a). When the signal at A—applied via resistor R5 to the − input of op-amp 111—exceeds that from the divider R2, R3 the op-amp 111 reverts to a cut-off condition and its output B falls abruptly from + Vcc to approximately zero. The R-C circuit R6, C1 taken with the op-amp 111 forms a timing device which measures off a preliminary time interval between the instants $t_0$ and $t_1$ as labeled in FIG. 6a. This preliminary interval assures that all other components, e.g., the sawtooth generator 115, have ample time to stabilize after the instant that the switch SW closes.

In accordance with one embodiment of the present invention a predetermined time period is measured off and during such period the clutch coil is energized at a relatively high level, i.e., with high exciting current sufficient to create an m.m.f. in the clutch flux path to make the armature 18 move to close the main air gap 54. The time period is measures off by a monostable multivibrator or one-shot circuit 101 triggered by the negative-going voltage transition passed through a differentiating capacitor C2 when the signal B falls at instant $t_1$. The one-shot resets after a predetermined period P and at the latter instant $t_2$, as shown by curve C (FIG. 6a) representing the one-shot's output.

The duration of the period P is selected or predetermined (by design or adjustment of the one-shot 101) to be essentially equal to, and at least as long as, the time required for the armature 18 to move and close the gap 54—in the particular clutch 11 with which the control unit is bieng used—after the source voltage $V_{BAT}$ is applied to the clutch coil 47. When different sizes or types of clutches are to be controlled, it is a simple matter to determine such "closing time" and to appropriately adjust the one-shot 101 to change the period P.

Over the span of the period P, the signal at C passes through a resistor R8 and diode D3 to the − input of the op-amp 113. This makes the − input signal H approximately equal to Vcc, so that the sawtooth signal at the + input never exceeds it. Therefore, the op-amp 113 is placed and remains in a cut-off condition. As shown in FIG. 6b, the signal J thus falls essentially to zero at the instant $t_1$ and so remains until the instant $t_2$ (i.e., during the period P). Since the signal J is low, the transistor T3 is cut off and the final control element, that is, Darlington pair T1 and T2, turns steadily full on—so the voltage $V_{BAT}$ is connected in series with the coil 47 to drive exciting current through the latter. In effect, a step voltage is applied to the coil 47. Due to the coil inductance, the current through the coil—represented at K—rises exponentially during the period P. See curve K in FIG. 6b. At about the end (instant $t_2$) of the period P the coil current and resulting m.m.f. in the clutch flux path have increased sufficiently to attract the armature 18, against the biasing force of the springs 50, into contact with the rotor 30.

If the exciting current and m.m.f. were left at such a high level (and recognizing that flux increases dramatically for a given m.m.f. when the air gap closes, thus causing a great decrease in flux path reluctance), the magnetic attraction force pulling the armature against the rotor would be very great. This would create, immediately upon closure of the gap, torque coupling of the two members almost equal, if not equal, to the maximum rated torque resulting from steady rated excitation current through the coil. With the inertia plus the steady resistance of the driven load, this sudden "full force" of engagement may often produce "stick-slip" or slip-and-hold chatter in the rubbing of the armature face across the rotor face. Such chatter is extremely noisy. And the sudden torque through the clutch can produce belt slippage on pulleys, with "belt screech" noise. Moreover, chatter produces increased wear on the clutch parts as compared to smooth slippage. Moreover, sudden shocks of rapid acceleration may, with repetition, mechanically damage the drive components or the driven devices.

In carrying out the invention by the embodiment shown in FIG. 5, means are provided to reduce the level of clutch energization by reducing the average coil excitation current and the average m.m.f. at about the instant that the gap closes. In the apparatus here shown, this occurs at the end, or approximately at the end, of the predetermined period P.

It is to be observed, first, that the signals B and C are fed additively via resistors R16 and R17 to the − input of an op-amp 105. The signal D (FIG. 6a) at the − input thus is high in the time interval $t_0$ to $t_1$ because signal B is then high; and the signal D is high during the period P because the signal C is then high. Thus, between instants $t_0$ and $t_2$ the output E from op-amp 105, and which is applied across a potentiometer R12, is essentially zero. Between the instants $t_0$ and $t_1$, the signal C applied to a potentiometer R1 is essentially zero. The voltages $V_1$ and $V_2$ from those two potentiometers thus make the signal F zero between instants $t_0$ and $t_1$ (see FIG. 6a).

The signal F is applied via a resistor R15 to the + input of an op-amp 103 having a capacitor C3 connected in a negative feedback path to the − input. This creates a well-known integrator whose output signal G varies as the time integral of the signal applied to the + input. But since that input signal is essentially zero between instants $t_0$ and $t_1$, the output G remains at zero over the preliminary interval.

At the instant $t_1$, the signal C becomes essentially equal to Vcc and the voltage $V_1$ becomes some fraction thereof, say 0.7 Vcc. A diode D4 leading to resistor R15 is thus forwardly biased and conductive, so during the period P, the integrating action causes the signal G to rise with a predetermined slope, shown ideally as linear in FIG. 6a. By adjusting the potentiometer R1 to pick a value for $V_1$ and thus choose the slope in relation to the duration of the period P, the level $V_3$ of the signal G at the end of the period P can be predetermined. As will be explained, this establishes the level to which the energization or coil excitation is reduced at the end of the period P.

At the instant $t_2$ when the signals C and $V_1$ revert to zero, the signal E rises essentially to Vcc, and the signal $V_2$ becomes some fraction thereof (say 0.1 Vcc) established by the adjustment of the potentiometer R12. The diode D4 becomes reversely biased because $V_1$ is greater than the zero value of $V_2$, so the input signal F to the integrating op-amp is determined by $V_1$. Now, the output G of the integrating op-amp 103 continues, after the end of the period P, to rise on a ramp (shown ideally as linear in FIG. 6a) whose slope is determined by the selected magnitude of the voltage $V_1$.

The ramp voltage G is fed via a resistor R22 to the − input of the comparator op-amp 113. When the signal C falls at the end of the period P, the diode D3 is reversely biased, so the signal at the − input of op-amp 113 is the signal G. The comparing action causes the signal J (a) to switch from Vcc to zero at those instants when the sawtooth signal drops from Vcc to zero, and (b) to switch from zero to Vcc at those instants when the rising leg of a sawtooth crosses and exceeds the then-existing level of the ramp signal G. The signal J is thus pulse-width modulated with its "on" intervals and its duty cycle becoming progressively less as the ramp signal G rises. Inasmuch as the transistor T3 is turned "on" with a progressively decreasing duty cycle, the Darlington pair T1 and T2 is turned on with a progressively increasing duty cycle. The inductance of the coil 47 acts effectively as an averaging filter when the voltage $V_{BAT}$ is applied across the coil with a progressively increasing duty cycle of pulses; in consequence, although the current through the coil varies somewhat with time, the effective average current (and the resulting average m.m.f. in the clutch flux path) rises between the instants $t_2$ and $t_3$ as illustrated by the average current Curve K in FIG. 6b.

From the foregoing, it will be seen that after the initial period P and starting at instant $t_2$, the average excitation current (Curve K) is reduced from level L1 to a lower level L2. Therefore at about the instant $t_2$ when the clutch gap closes, the full magnetic attractive force between the touching armature and rotor—and an attempt at "full coupling torque"—does not exist. Instead, the lower level L2 of average excitation current (which can be chosen by adjustment of potentiometer R1) permits the armature and rotor to slip freely relative to one another without slip-and-hold chatter. Preferably the level L2 is chosen such that when the period P ends (and the gap is closed at instant $t_2$ as shown in FIG. 6b), the m.m.f. is just enough to keep the members in contact while permitting maximum or 100% slip beween them (as shown by Curve N). This means that at instant $t_2$ the torque coupling or transmissible torque (Curve M) is essentially zero. But, of course, in many specific applications, the reduced level L2 for the average excitation current need not be made quite so low. It is to be noted, however, that at instant $t_2$ when pulse width modulation by the final transistors T1, T2 begins, their duty cycle and the average current is not zero.

Over the span between instants $t_2$ and $t_3$ (about 2.5 to 3 seconds in one actual embodiment) the average exciting current is smoothly increased as the duty cycle of the signal J is smoothly decreased. Thus, the magnetic force pressing the armature and rotor faces together smoothly rises, the torque transmissible by friction likewise rises (Curve M) and the ratio of rotor or output speed to armature or input speed likewise rises as slip falls. By the instant $t_3$ when the ramp signal G from the integrator 103 has reached and leveled off at its maximum value, the duty cycle of the signal J is down almost to zero, and the duty cycle of the Darlington pair is almost 100%—so, in effect, the coil exciting current is almost steady and has essentially its maximum or rated value. The clutch is excited "full on" so the armature and rotor are locked and capable of transmitting rated torque.

In summary, the present invention brings to the art a method and apparatus for controlling gap-type electromagnetic couplings in a fashion which avoids stick-slip chatter and noise immediately following the instant at which the armature and rotor come into touching contact when the gap is closed. The high m.m.f. required to get the gap to close is created during an initial period, but the m.m.f. is then reduced so that a "soft start", with smooth but progressively decreasing slippage of the members, is obtained. Not only is clutch chatter noise and belt screech alleviated; smoother acceleration of driven loads with less shock on driving and driven components is also a yielded benefit.

I claim as my invention:

1. Apparatus for energizing the multiple-turn winding of an electromagnetic coupling having an armature and a rotor separated by an air gap, said apparatus comprising:

first means for initially energizing said winding for a period of time sufficient to build magnetic flux between said armature and rotor and across said air gap so as to cause said armature and rotor to close the air gap between them;

second means for reducing the energization of said winding after the termination by said first means of said initial energization so as to allow slippage between said armature and rotor; and third means, operative after the reducing effected by said second means, for gradually increasing the energization of said winding so as to increase the coupling torque and decrease the slippage between said armature and said rotor.

2. Apparatus as set forth in claim 1 wherein said first means includes means for applying a source voltage to said winding for a predetermined time so that winding excitation current increases to a relatively high level sufficient to move the armature across the air gap and into contact with said rotor.

3. Apparatus as set forth in claim 1 wherein said second means includes means for reducing the average excitation current through said winding to a predetermined level which holds the armature and rotor in contact but which produces approximately zero torque coupling between the armature and rotor.

4. Apparatus as set forth in claim 1 wherein after the initial energization of said winding by said first means, said second means controls the average current through said winding so as to reduce the energization of said winding.

5. Apparatus as set forth in claim 4 wherein said third means supplies said winding with an average current whose value increases in time from an initial value equal to the average current in said winding supplied by said second means to a final value equal to the steady-state rated current value for said winding.

6. Apparatus as set forth in claim 1 including a final current control element in series with said winding and constituting a part of said first, second and third means.

7. Apparatus as set forth in claim 6 wherein said control element is a switch held closed by said first means and pulse-width modulated opened and closed by said second and third means.

8. Apparatus as set forth in claim 1 wherein said first means is initiated into operation by means responsive to a command signal calling for engagement of the electromagnetic coupling.

9. Apparatus as set forth in claim 1 wherein said first means includes means for connecting a dc. voltage source in series with said winding for said period of time.

10. Apparatus as set forth in claim 9 wherein said connecting means is a final control element in series with said winding and dc. voltage source, said control element constituting a part of said first, second and third means and being operable to connect and disconnect said winding to said source.

11. Apparatus as set forth in claim 10 wherein said final control element includes a solid state switch which is held steadily conductive by said first means so as to conduct excitation current from said dc. voltage source through said winding.

12. Apparatus as set forth in claim 11 wherein said switch is pulse-width modulated opened and closed by said second and third means so as to control the average exciting current through said winding.

13. A control unit responsive to a command signal for causing an electromagnetic coupling to engage, said coupling having (a) first and second members normally separated by an air gap and rotatable relative to one another, said members being movable into engagement by closure of the gap, (b) spring means for normally holding said members separated by said gap and disengaged, and (c) a multiple-turn winding and magnetically permeable flux path means for producing, when the winding is excited, magnetic flux threading through said members and gap to attract said members into torque-transmitting engagement, said control unit comprising, in combination, (1) means responsive to said command signal for exciting said winding to create an average m.m.f. in said flux path means sufficient to attract said members into touching contact by relative motion which closes said gap, (2) means responsive to the termination of winding excitation by said means (1) for reducing the average m.m.f. in said flux path means to a level at which said members are retained in touching contact but with a sufficiently low force that the members may rotatively slip without transmitting from one to the other the full torque for which the coupling is rated, and (3) means operative after said means (2) have acted for gradually increasing the average m.m.f. in said flux path upwardly from its reduced value to a predetermined value which causes said members to be magnetically attracted so as to produce rated torque transmission.

14. A control unit as set forth in claim 13 wherein said means (1) includes means for exciting said winding for a predetermined period of time.

15. A control unit as set forth in claim 13 including, a final control element in series connection with said winding and a dc. voltage source, said element forming a part of each of said means (1), (2) and (3) to control the excitation of said winding.

16. A control unit as set forth in claim 15 wherein said control element, as a part of said means (1), connects said winding steadily in series with said dc. voltage source.

17. Apparatus responsive to a command signal for energizing the mutiple-turn winding of an electromagnetic coupling having an armature and a rotor separated by an air gap, said apparatus comprising:

a current control element in series with said winding and a dc. voltage source to variably control excitation current through the winding, first means responsive to the command signal for initially conditioning said control element so as to connect said winding steadily in series with said voltge source for at least a period of time sufficient to draw the armature into contact with said rotor; and second means, responsive to the end of the energization of said winding controlled by said first means, for conditioning said control element, so as (a) to restrict the current through said winding to an average level less than that at the end of the energization of said winding controlled by said first means and (b) thereafter to smoothly increase the average current through said winding to a level which provides full torque coupling between said armature and rotor.

18. Apparatus as set forth in claim 17 wherein said initial conditioning by said first means is for a predetermined time duration sufficient to insure the attractive force developed between said armature and said rotor is sufficient to move the armature across the air gap and into contact with said rotor.

19. Apparatus as set forth in claim 17 wherein said second means (i) reduces the average current through said winding to a predetermined level which produces approximately zero torque coupling between said rotor and said armature and (ii) thereafter smoothly increases the average current through said winding rotor over a time period sufficient to cause reduction of slippage between said armature and rotor with alleviation of chatter and noise.

20. Apparatus as set forth in claim 17 wherein said current control means is a switch controlled by said first means to be steadily closed and controlled by said second means to be alternately opened and closed at a frequency and variable duty cycle which initially permits smooth slippage of the armature relative to the rotor.

21. A method for energizing a multiple-turn winding of an electromagnetic coupling, wherein the armature and rotor of the coupling are separated by an air gap when the coupling is disengaged, said method comprising the steps of:
  energizing said winding so as to cause said armature to move across said air gap and into contact with said rotor;
  reducing the energization of said winding after said gap has been closed so as to initially reduce the torque coupling which would otherwise be created between said armature and said rotor; and
  gradually increasing the energization of said winding to full energization so as to provide a gradually increasing torque coupling between said armature and said rotor, thereby to alleviate the audible noise generated by the physical engagement of the armature to the rotor.

22. A method for energizing a multiple-turn winding of an electromagnetic coupling as set forth in claim 23 wherein the energization of said winding is reduced and thereafter increased to full torque coupling by pulse-width modulating the energization of said winding.

23. A method for energizing a multiple-turn winding of an electromagnetic coupling as set forth in claim 23 wherein the energization of said winding is reduced, after closure of said air gap, to a level which maintains gap closure but creates approximately zero torque coupling.

* * * * *